(12) United States Patent
Kakinuma et al.

(10) Patent No.: US 7,301,563 B1
(45) Date of Patent: Nov. 27, 2007

(54) IMAGE PICKUP APPARATUS

(75) Inventors: Minoru Kakinuma, Hachioji (JP);
Hidetoshi Fukuda, Yokohama (JP);
Hiroaki Koseki, Kokubunji (JP);
Takumi Momose, Hachioji (JP);
Osamu Inagaki, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/358,657

(22) Filed: Jul. 26, 1999

(30) Foreign Application Priority Data

Jul. 28, 1998 (JP) ................................ 10-226575

(51) Int. Cl.
- *H04N 5/228* (2006.01)
- *H04N 5/235* (2006.01)
- *H04N 7/18* (2006.01)
- *G03B 7/00* (2006.01)

(52) U.S. Cl. .................. 348/208.13; 348/362; 348/155
(58) Field of Classification Search ................ 358/448, 358/450, 452, 453, 909.1; 348/221.1, 229.1, 348/362–364
See application file for complete search history.

(56) References Cited

U.S. PATENT DOCUMENTS

| | | | |
|---|---|---|---|
| 4,320,948 A * | 3/1982 | Hosoe et al. ................ 396/153 |
| 5,162,914 A | 11/1992 | Takahashi et al. ...... 358/213.19 |
| 5,235,427 A * | 8/1993 | Kim ........................ 348/208.16 |
| 5,309,243 A | 5/1994 | Tsai ............................ 348/221 |
| 5,353,091 A * | 10/1994 | Ishida et al. .................... 396/55 |
| 5,420,635 A * | 5/1995 | Konishi et al. .............. 348/362 |
| 5,473,441 A * | 12/1995 | Inuiya et al. .................. 386/73 |
| 5,754,226 A * | 5/1998 | Yamada et al. ........... 348/219.1 |
| 5,801,773 A | 9/1998 | Ikeda ......................... 348/229 |
| 5,949,481 A * | 9/1999 | Sekine et al. ........... 348/207.99 |

(Continued)

FOREIGN PATENT DOCUMENTS

EP 0 725 536 A2 8/1996

(Continued)

OTHER PUBLICATIONS

European Search Report dated Feb. 10, 2004.

*Primary Examiner*—Lin Ye
*Assistant Examiner*—Yogesh Aggarwal
(74) *Attorney, Agent, or Firm*—Westerman, Hattori, Daniels & Adrian, LLP.

(57) ABSTRACT

A short-time exposure image data and a long-time exposure image data of the same object to be photographed are stored to SE memory and LE memory and then transferred to CPU, motion thereof being detected at a motion detecting section on the basis of the two image data; if no motion is detected, a wide dynamic range, synthesized image as synthesized at a synthesizing circuit on the basis of image data read out from the two memories and compressed is outputted through a selector controlled by CPU. If a motion is detected, the long-time exposure image data read out from the LE memory and processed at a signal processing circuit is outputted through the selector. An image pickup apparatus having a function for generating wide dynamic range, synthesized image by synthesizing image signals corresponding to a plurality of frames of different exposure amounts is thereby able to perform ON/OFF switching of the generating function of synthesized image on the basis of previously taken image data, so that a failed synthesized image can be prevented from being outputted.

3 Claims, 8 Drawing Sheets

U.S. PATENT DOCUMENTS

| | | | | |
|---|---|---|---|---|
| 5,991,470 A | * | 11/1999 | Swithers et al. | 382/332 |
| 6,130,709 A | * | 10/2000 | Sekine et al. | 348/208.8 |
| 6,466,253 B1 | * | 10/2002 | Honjoh | 348/36 |
| 2003/0133035 A1 | * | 7/2003 | Hatano | 348/362 |

FOREIGN PATENT DOCUMENTS

| | | | |
|---|---|---|---|
| JP | 01060156 A | | 3/1989 |
| JP | 3179889 | * | 8/1991 |
| JP | 5-64075 | | 3/1993 |
| JP | 7-135599 | | 5/1995 |
| JP | 09312799 | | 2/1997 |
| JP | 09065269 | | 3/1997 |
| JP | 10-243288 | | 9/1998 |

* cited by examiner

IMAGE PICKUP APPARATUS

BACKGROUND OF THE INVENTION

The present invention relates to image pickup apparatus in which image signals corresponding to a plurality of frames at different exposure amounts are outputted from an image pickup device and are synthesized to obtain an image having wide dynamic range, and also relates to apparatus related thereto.

Solid-state image pickup devices such as CCD image pickup device are generally used in image pickup apparatus, as TV camera, video camera, electronic camera, etc. There is a problem however that the dynamic range of a solid-state image pickup device is much narrower than that of a silver salt photographic film.

To eliminate this problem, there have been proposed techniques in which image signals corresponding to two frames at different exposure amounts are read out from a single image pickup device and are synthesized to obtain an image having an increased dynamic range. For example, an image pickup apparatus having the following construction is disclosed in Japanese Patent Publication No. 2522015. In particular, a disclosure has been made with respect to an image pickup apparatus including: image pickup means for converting object image into electrical signals; image pickup control means for selectively executing a first mode or second mode, said first mode for successively outputting images at different exposure amounts in cycles by cyclically changing accumulating time at the image pickup means, image portions at suitable level being synthesized to form a synthesized frame of said predetermined cycle by respectively comparing signal level of each portion of a plurality of frames at different exposure amounts outputted from said image pickup means with a predetermined reference value, said second mode for providing output by using a constant accumulating time at said image pickup means; and switch control means for switching the image pickup control means to the first mode when an existence of object having a large difference in luminance within a frame is detected in said second mode by comparing signals obtained from said image pickup means with a predetermined signal level. This image pickup apparatus, when in the first mode, is capable of obtaining an image of which all the portions of the frame are at suitable signal level. Even when an object having a large difference in luminance exists within a frame as in a backlighted condition, lack of detail at high level portion for example does not occur within the frame and it is in effect possible to widen dynamic range thereof.

Further, without a determination made by the operator on the conditions of the object, etc., switching to the first mode is automatically made by the switching control means when an object having a large difference in luminance exists within the frame in the second mode, making it possible to automatically correct a backlighted condition, etc.

Further, a disclosure has been made in Japanese patent application laid open No. 5-64075 with respect to a video camera including: image pickup means including a solid-state image pickup device, for outputting image signals for representing an object image; motion detection means for determining based on the image signals obtained from the image pickup means whether a motion exceeding a predetermined amount occurs in the object or not; means for controlling exposure amount so that the image pickup means takes images of the object at two different exposure amounts on condition that a motion has not been detected by the motion detection means; and means for forming synthesized image signals by replacing, of the image signals representing an image at the larger exposure amount, those image signals representing regions of relatively high luminance in that image with those image signals representing the corresponding regions in an image at the smaller exposure amount. Also, the same publication discloses a video camera which furthermore includes high luminance region detection means for determining whether or not, of the above described image signals for representing an image at the larger exposure amount, the regions of relatively high luminance in that image exceed a predetermined area. The above described exposure amount control means controls the exposure amount so that images can be picked up at two different exposure amounts on condition that no motion has been detected by the above motion detection means and that a high luminance region has been detected by the above described high luminance region detection means.

In the above described image pickup apparatus as disclosed in Japanese Patent Publication No. 2522015, however, the mode switching means for switching to the first mode for generating image having a wide dynamic range is to switch the mode when an existence of object having a large difference in luminance is detected within a frame obtained in the second mode. The disclosure merely refers to the switching of mode depending on the conditions only of luminance values and other conditions concerning the generation of wide dynamic range image were not at all taken into consideration.

Further, in Japanese patent application laid open No. 5-64075, motion of the object is detected from image signals after image taking and a synthesized image is obtained by picking up images at two different exposure amounts on condition that motion of the object is absent. Thus the detecting of motion of the object from something other than the image signals before image taking was not taken into consideration. Other conditions for generating a synthesized image except the detection of motion of the object were not taken into consideration either.

SUMMARY OF THE INVENTION

The present invention has been made to eliminate the above described problems in the conventional image pickup apparatus having a function for synthesizing two image signals of different exposure amounts to generate wide dynamic range, synthesized image. Its main object is to provide an image pickup apparatus in which ON/OFF switching of processing for the generation of wide dynamic range, synthesized image can be performed at high accuracy.

In a first aspect of the invention, there is provided an image pickup apparatus including: image pickup means capable of taking images of the same object at a plurality of different exposure amounts to generate image signals corresponding to a plurality of frames at different exposure amounts; and means for generating wide dynamic range, synthesized image by synthesizing image signals corresponding to a plurality of frames at different exposure amounts obtained by the image pickup means. It further includes means for determining whether or not a suitable synthesized image can be obtained on the basis of image signals corresponding to a plurality of previously taken frames; and means for controlling ON/OFF switching of the generation processing operation at the means for generating synthesized image based on an output of the determination means.

Since ON/OFF switching control of the generation processing operation at the means for generating wide dynamic range, synthesized image is thus performed based on image signals corresponding to a plurality of previously taken frames, an image pickup apparatus can be achieved as capable of accurately performing ON/OFF switching control of processing operation for the generation of wide dynamic range, synthesized image. The above main object is thereby accomplished.

It is another object of the present invention to provide an image pickup apparatus in which, when the object has been moved, it is possible to prevent a failure of wide dynamic range, synthesized image.

In a second aspect of the invention, the determination means of the image pickup apparatus according to the first aspect includes means for detecting motion in the object image and the generation processing operation at the means for generating synthesized image is switched to OFF when motion in the object image has been detected by the motion detection means.

Since the motion detection means is thus provided so as not to perform processing operation for the generation of synthesized image if a motion in the object image has been detected, it is possible to prevent a failure of wide dynamic range, synthesized image when the object has been moved. The above object is thereby accomplished.

It is still another object of the invention to provide an image pickup apparatus in which the feasible range for image taking can be made greater with respect to the conditions of object of which a wide dynamic range, synthesized image can be formed.

In a third aspect of the invention, the determination means of the image pickup apparatus according to the first aspect includes means for detecting motion in the object image and motion amount determination means for determining whether or not the amount of motion detected by the motion detection means is within an allowable range for correction. The apparatus further includes motion correction means for, when the amount of motion is determined as within the allowable range for correction by the motion amount determination means, correcting the amount of motion based on such determination output so that synthesizing process be performed with correcting the amount of motion of the image signals corresponding to a plurality of frames.

Since the motion detection means and the motion amount determination and the motion correction means are thus provided so as to perform synthesizing process with correcting the amount of motion when the motion amount is within the allowable range for correction, it is possible to provide a grater range for the conditions of object of which a wide dynamic range, synthesized image can be formed. The above object is thereby accomplished.

It is yet another object of the invention to provide an image pickup apparatus capable of taking images suitable for the generation of wide dynamic range, synthesized image without requiring detection of the conditions for generating wide dynamic range, synthesized image after the taking of image.

In a fourth aspect of the invention, there is provided an image pickup apparatus including: image pickup means capable of taking images of the same object at a plurality of different exposure amounts to generate image signals corresponding to a plurality of frames at different exposure amounts; and means for generating wide dynamic range, synthesized image by synthesizing image signals corresponding to a plurality of frames at different exposure amounts obtained by the image pickup means. It further includes means for determining whether or not a suitable synthesized image can be obtained on the basis of information of the object obtained before the taking of image; and means for controlling ON/OFF switching of the generation processing operation at the means for generating synthesized image based on an output of the determination means.

ON/OFF switching of processing operation for the generation of wide dynamic range, synthesized image can thus be effected relying on object information obtained before the taking of image such as the information on detection of motion of the object which is obtained based on an output from an external AF detection circuit or external AE detection circuit. An image pickup apparatus can be achieved as capable of taking images suitable for the generation of wide dynamic range, synthesized image. The above object is thereby accomplished.

It is a further object of the invention to provide an image pickup apparatus adapted to be capable of readily generating wide dynamic range, synthesized image even of an object involving a motion owing to the fact that the motion of the object can in effect be stopped by strobe image taking.

In a fifth aspect of the invention, an image pickup apparatus according to the fourth aspect includes strobe emission means. In addition, the determination means thereof includes means for detecting motion in the object image so that, when a motion in the object image has been detected by the motion detection means, images are taken in a forced strobe emission mode to perform the generation processing of synthesized image.

Since images are thus taken in a forced strobe emission mode and the generation processing of synthesized image is performed when a motion in the object has been detected at the motion detection means, the motion in the object can in effect be stopped even of an object involving a motion, making it possible to readily generate a wide dynamic range, synthesized image. The above object is thereby accomplished.

It is a further object of the invention to provide an image pickup apparatus adapted to be capable of also readily generating wide dynamic range, synthesized image even of an object involving a motion owing to the fact that the motion in the object can in effect be reduced by using a higher shutter speed.

In a sixth aspect of the invention, an image pickup apparatus according to the fourth aspect includes a shutter speed/diaphragm control means. In addition, the determination means thereof includes means for detecting motion in the object image so that, when a motion in the object image has been detected by the motion detection means, images are taken by using a higher shutter speed to perform the generation processing of synthesized image.

Since the generation processing of synthesized image is thus performed at a higher shutter speed when a motion in the object image has been detected, the motion of the object in image signals corresponding to a plurality of frames can be reduced. Since the motion of the object can in effect be reduced even of an object involving a motion by using the higher shutter speed, it becomes possible to readily generate a wide dynamic range, synthesized image. The above object is thereby accomplished.

It is a further object of the invention to provide an image pickup apparatus capable of generating a suitable wide dynamic range, synthesized image by detecting a backlighted condition.

In a seventh aspect of the invention, the determination means of the image pickup apparatus according to the fourth aspect includes an AE detection circuit and the generation processing of synthesized image is performed when a backlighted condition has been detected by the AE detection circuit.

Upon the detection of a backlighted condition at the AE detection circuit, since the condition for wide dynamic range prevails at the time of the backlighted condition, a suitable synthesized image can be obtained by performing the generation processing of wide dynamic range, synthesized image. The above object is thereby accomplished.

It is a further object of the present invention to provide an image pickup apparatus in which images can be readily taken in a manner suitable for the generation of wide dynamic range, synthesized image without requiring detection of the conditions for the generation of wide dynamic range, synthesized image from taken images.

In an eighth aspect of the invention, there is provided an image pickup apparatus including: image pickup means capable of taking images of the same object at a plurality of different exposure amounts to generate image signals corresponding to a plurality of frames at different exposure amounts; and means for generating wide dynamic range, synthesized image by synthesizing image signals corresponding to a plurality of frames at different exposure amounts obtained by the image pickup means. It further includes means for determining whether or not a suitable synthesized image can be obtained on the basis of information set in the image pickup apparatus before the taking of image; and means for controlling ON/OFF switching of the generation processing operation at the means for generating synthesized image based on an output of the determination means.

Since ON/OFF switching of the generation processing operation at the means for generating wide dynamic range, synthesized image is thus controlled based on information set in the image pickup apparatus before the taking of image, an image pickup apparatus can be achieved as capable of readily taking images in a manner suitable for the generation of wide dynamic range, synthesized image without requiring detection of the conditions for the generation of wide dynamic range, synthesized image from taken images. The above object is thereby accomplished.

It is a further object of the present invention to provide an image pickup apparatus in which it is possible to make a determination based on the shutter speed and lens zoom information as to whether or not a suitable synthesized image can be generated.

In a ninth aspect of the invention, information set in the image pickup apparatus according to the eighth aspect is shutter speed information and/or lens zoom information and the determination means makes a determination based on the shutter speed and/or lens zoom information.

By constructing in this manner, ON/OFF switching of the generation processing operation of synthesized image can be performed in linkage with the shutter speed and lens zoom information. When the shutter speed is slow or when the zoom ratio is high, the generation processing operation of synthesized image can be turned OFF to avoid a failure in the synthesized image which occurs due to a movement of the object. The above object is thereby accomplished.

It is a further object of the present invention to provide an image pickup apparatus having a function for generating wide dynamic range, synthesized image by synthesizing a plurality of image signals of different exposure amounts, in which a suitable synthesized image is always obtained even when a shift from set exposure amounts has occurred.

In a tenth aspect of the invention, there is provided an image pickup apparatus including: image pickup means capable of taking images of the same object at a plurality of different exposure amounts to generate image signals corresponding to a plurality of frames at different exposure amounts; and means for generating wide dynamic range, synthesized image by synthesizing image signals corresponding to a plurality of frames at different exposure amounts obtained by the image pickup means. It further includes: means for correcting exposure amounts of the image signals corresponding to a plurality of frames of different exposure amounts; and switching control means for performing ON/OFF switching of the correction operation at the exposure amount correction means based on an image taking mode set at the image pickup apparatus.

By thus providing the means for correcting exposure amounts of image signals and ON/OFF switching control means based on the image taking mode at the exposure amount correction means, the exposure amounts can be corrected to obtain a suitable synthesized image only when there is a possibility of shift from the set exposure amounts of the image signals corresponding to a plurality of frames of different exposure amounts. The above object is thereby accomplished.

It is a further object of the invention to provide an image pickup apparatus in which a suitable synthesized image can be obtained even when using a strobe.

In an eleventh aspect of the invention, the image pickup apparatus according to the tenth aspect further includes strobe emission means. The switching control means controls switching so that the exposure amount correction means is caused to operate when the apparatus has been set to a strobe image taking mode.

While a variance tends to occur in the emission amount of a strobe, a suitable synthesized image for example without a discontinuity in gradation can be generated even when images are taken by using strobe, since the exposure amount correction means is forced to operate at the time of the strobe image taking mode. The above object is thereby accomplished.

It is a further object of the invention to provide an image synthesizing system capable of generating wide dynamic range, synthesized image in which image taking interval can be reduced without requiring a complicated processing at the image pickup apparatus thereof.

In a twelfth aspect of the invention, there is provided an image synthesizing system, including: an image pickup apparatus having image pickup means capable of taking images of the same object at a plurality of different exposure amounts to generate image signals corresponding to a plurality of frames at different exposure amounts and recording means for recording as a single file to a recording medium the image signals corresponding to a plurality of frames obtained by the image pickup means and synthesizing information to be used in generating a wide dynamic range, synthesized image by synthesizing the image signals corresponding to the plurality of frames; and an external synthesizing apparatus having synthesizing means for synthesizing the image signals corresponding to a plurality of frames within a file recorded in the recording medium based on the synthesizing information in the file.

By thus performing synthesizing process at an external synthesizing apparatus externally connected to the image pickup apparatus, it becomes unnecessary to perform a complicated synthesizing process within the image pickup apparatus. Time for processing of image taking is shortened and it becomes possible to reduce the image taking interval. The above object is thereby accomplished.

It is a further object of the present invention to provide an image synthesizing system in which image signals corresponding to one frame can be recorded when the remaining capacity of the recording medium is less than that for recording image signals corresponding to a plurality of frames.

In a thirteenth aspect of the invention, the image synthesizing system according to the twelfth aspect further includes detection means for detecting the remaining capacity of the recording medium. The remaining capacity of the recording medium is detected by the detection means and, if not enough remaining capacity left in the recording medium for recording image signals corresponding to a plurality of frames of different exposure amounts, image signals corresponding to one frame is obtained by taking image of the object at a predetermined exposure amount by the image pickup means and such image signals corresponding to one frame is recorded to the recording medium by the recording means.

By such construction, an ordinary image taking corresponding to one frame can be performed even when the remaining capacity of the recording medium is not enough for recording image signals corresponding to a plurality of frames. The above object is thereby accomplished.

It is a further object of the present invention to provide an image pickup apparatus in which, when image signals corresponding to a plurality of frames for generating a wide dynamic range, synthesized image are to be recorded in a recording medium, synthesizing process thereof can be performed by treating them in a similar manner as image signals corresponding to an ordinary one frame.

In a fourteenth aspect of the invention, there is provided an image pickup apparatus which includes: image pickup means capable of taking images of the same object at a plurality of different exposure amounts to generate image signals corresponding to a plurality of frames at different exposure amounts; and recording means for recording as a single file to a recording medium the image signals corresponding to a plurality of frames obtained by the image pickup means and synthesizing information to be used in generating wide dynamic range, synthesized image by synthesizing the image signals corresponding to the plurality of frames.

Since image signals corresponding to a plurality of frames and the synthesizing information thereof are recorded as a single file to the recording medium, it is possible to perform synthesizing process by treating them similarly as in the case of image signals corresponding to an ordinary single frame. The above object is thereby accomplished.

It is a further object of the present invention to provide an external synthesizing apparatus in which, when a wide dynamic range, synthesized image is generated by synthesizing image signals corresponding to a plurality of frames, the synthesized image can be generated similarly as an ordinary single image signal without a special operation.

In a fifteenth aspect of the invention, there is provided an external synthesizing apparatus including synthesizing means for reading a file out from a recording medium, said file being recorded in said recording medium as a single file recording image signals corresponding to a plurality of frames of different exposure amounts obtained by taking images of the same object at a plurality of different exposure amounts and synthesizing information to be used in generating wide dynamic range, synthesized image by synthesizing the image signals corresponding to the plurality of frames, said synthesizing means generating wide dynamic range, synthesized image by synthesizing the image signals corresponding to the plurality of frames contained in the file based on the synthesizing information contained in the file.

Since image signals corresponding to a plurality of frames and synthesizing information thereof are thus recorded as a single file in a recording medium from which said file is read out to effect synthesizing process, a wide dynamic range synthesized image can be outputted similarly as in the case of an ordinary taken image without a special operation. The above object is thereby accomplished.

It is a further object of the invention to provide a recording medium recorded in which includes a program capable of readily performing synthesis of image signals corresponding to a plurality of frames obtained by taking images of the same object at a plurality of different exposure amounts.

A recording medium recording a program for performing synthesis of image signals corresponding to a plurality of frames obtained by taking images of the same object at a plurality of different exposure amounts is provided in accordance with a sixteenth aspect of the invention, the recording medium recording, as a single file, the image signals corresponding to the plurality of frames of different exposure amounts and synthesizing information to be used in generating a wide dynamic range, synthesized image by synthesizing the image signals corresponding to the plurality of frames and at the same time recording a program for achieving a function for reading out the file to synthesize the image signals corresponding to the plurality of frames contained in the file based on the synthesizing information contained in the file.

By constructing in this manner, a recording medium can be provided as that recording a program by which synthesis can be readily performed of image signals corresponding to a plurality of frames obtained by taking images of the same object at a plurality of different exposure amounts. The above object is thereby accomplished.

DESCRIPTION OF THE PREFERRED EMBODIMENTS

Figure 1:
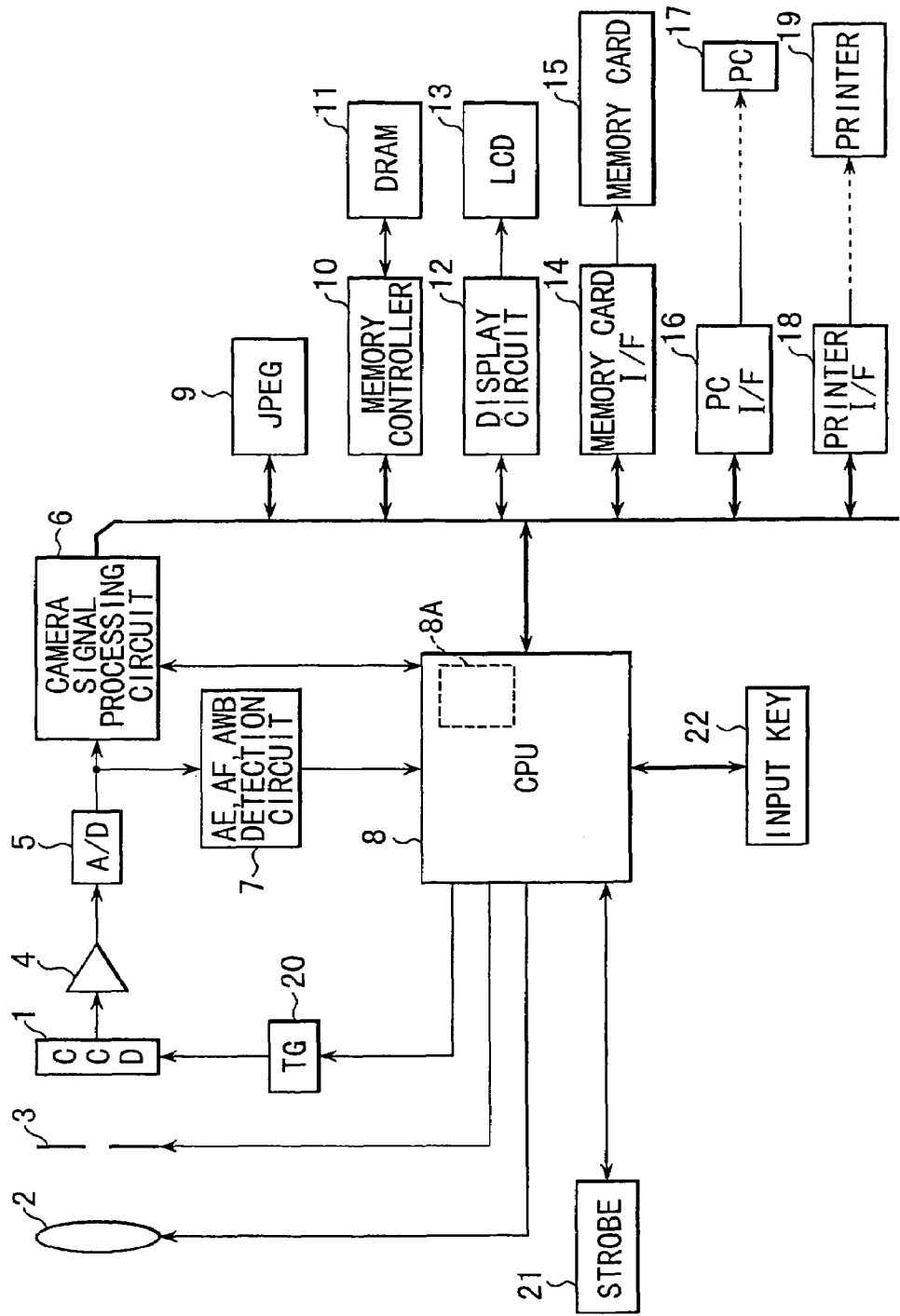
FIG. 1 is a block diagram showing an overall construction of a first embodiment of the image pickup apparatus according to the present invention.

Some embodiments of the present invention will now be described. First, a description will be given below by way of a block diagram shown in FIG. 1 with respect to an overall construction of a first embodiment of the electronic camera to which the present invention is applied. Referring to FIG. 1, denoted by numeral 1 is a single-plate (sensor) color CCD image pickup device for photoelectrically converting an optical signal into an electrical signal. It includes an electronic shutter function. An object light is inputted to CCD image pickup device 1 through a lens 2 and a stop/shutter mechanism 3. An output of CCD image pickup device 1 is amplified at an amplifier 4 after removed of noise for example at a correlation double sampling circuit. An analog-to-digital converter 5 converts the output of the amplifier 4 outputted as analog data into digital data. A camera signal processing circuit 6 processes signals from CCD image pickup device 1 as a video data. Those denoted by numeral 7 include AF detection circuit for extracting AF (autofocus) information to control focus, an AE detection circuit for extracting AE (auto exposure) information to control exposure, and AWB detection circuit for extracting AWB (auto white balance) information to set white balance, by using image pickup signals etc., from the CCD image pickup device 1 prior to the main taking of image. Output signals from the AF, AE, AWB detection circuit 7 supplies through CPU 8 AF information to lens 2, AE information to stop/ shutter mechanism 3, and AWB information to the camera signal processing circuit 6.

Numeral 9 denotes a compression-circuit (JPEG) for compressing the amount of data. The image data compressed at the compression circuit 9 is recorded at memory card 15 through memory card I/F 14. Memory controller 10 and DRAM 11 are used as working memory when performing color processing, etc., of video data. A display circuit 12 and LCD display unit 13 are used for example to confirm the image taking conditions by reading out and displaying data recorded at the memory card 15. Denoted by numeral 16 is a personal computer I/F for transferring data recorded on the memory card 15 to a personal computer 17. Further, denoted by numeral 19 is a printer for providing a print output of image pickup data recorded on the memory card 15 and 18 is a printer I/F to be used in transferring data to the printer 19. It should be noted that, in FIG. 1, numeral 20 denotes a timing generator which generates timing pulse for driving the CCD image pickup device 1. It drives the CCD image pickup device 1 according to control of CPU 8. Numeral 21 denotes a strobe mechanism which is controlled through CPU 8 by AE information to be obtained before the main taking of image and effects control as to whether strobe is to be emitted or not and control of light amount of the strobe emission. Numeral 22 denotes input keys of CPU by which setting of various types of image taking mode, driving of trigger switch, etc., can be performed.

Operation of an electronic camera having the above construction is summarized as follows. Image pickup signals generated by means of two times of image taking under different exposure conditions by using the CCD image pickup device 1 are respectively converted into digital signals at the analog-to-digital converter 5 and are subjected to a predetermined synthesizing operation processing at the camera signal processing circuit 6 to obtain a single synthesized image data which has a wide dynamic range as a whole. The synthesized image data is compressed at the compression circuit 9 and is recorded to the memory card 15.

Figure 2:
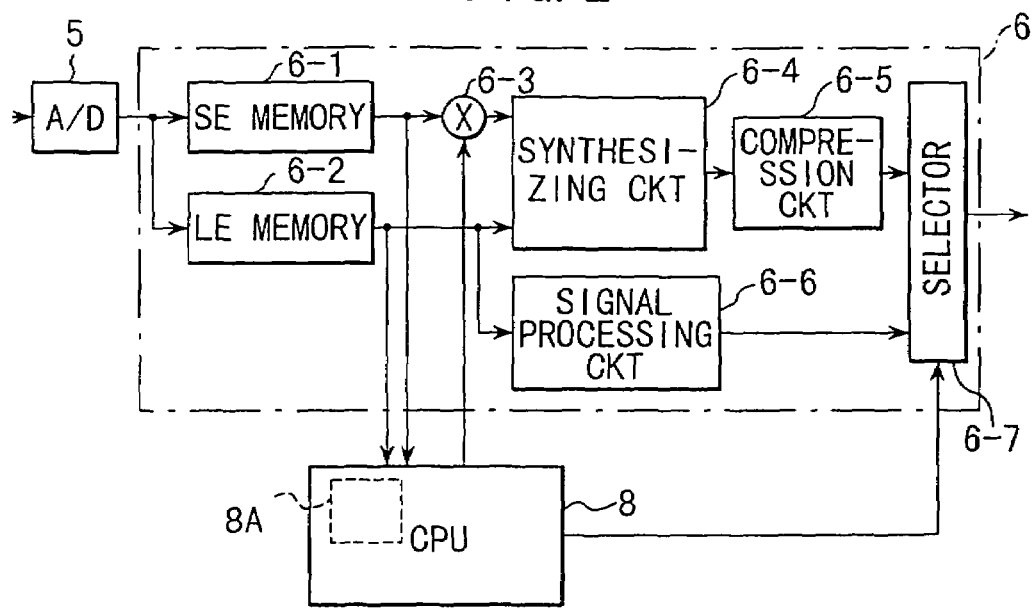
FIG. 2 is a block diagram showing an example of construction of the camera signal processing circuit in the embodiment shown in FIG. 1.

A construction of the camera signal processing circuit 6 in an embodiment shown in FIG. 1 will now be described by way of the block diagram of FIG. 2. FIG. 2 includes: 6-1, SE memory for storing short-time exposure image data; 6-2, LE memory for storing long-time exposure image data; 6-3, a multiplier for multiplying a short-time exposure image data read out from the SE memory 6-1 by an exposure amount ratio A (=LE/SE) of the short-time exposure image and long-time exposure image; 6-4, a synthesizing circuit for forming by means of synthesis a wide dynamic range, synthesized image from the short-time exposure image data after the multiplication and the long-time exposure image data read out from the LE memory 6-2; 6-5, a compression circuit for compressing the synthesized image obtained at the synthesizing circuit 6-4; 6-6, a signal processing circuit for subjecting the long-time exposure image data read out from the LE memory 6-2 to such processing as γ-correction and edge enhancement; and 6-7, a selector for providing an output by switching based on control signal from CPU 8 between the synthesized image from the synthesizing circuit 6-4 and the long-time exposure image data having been subjected to signal processing at the signal processing circuit 6-6. Further, denoted by numeral 8A is a motion detecting section provided internally of CPU 8, for detecting motion in the object based on the short-time exposure image data and long-time exposure image data read out from the SE memory 6-1 and LE memory 6-2. Switching of the selector 6-7 is controlled on the basis of the output of the motion detecting section 8A.

A description will now be given with respect to an operation of thus constructed camera signal processing circuit 6. First, short-time exposure image data and a long-time exposure image data of the same object taken at the CCD image pickup device 1 are temporarily stored to SE memory 6-1 and LE memory 6-2. The image data are then transmitted into CPU 8 from the two memories 6-1, 6-2. A motion of the object is detected at the motion detecting section 8A based on the two image data of different exposure amounts. If no motion is detected at the motion detecting section 8A, a wide dynamic range, synthesized image synthesized at the synthesizing circuit 6-4 based on the image data read out from the two memories 6-1, 6-2 and compressed at the compression circuit 6-5 is outputted through the selector 6-7 which is controlled by CPU 8. On the other hand, if a motion is detected, the long-time exposure image data read out from the LE memory 6-2 and subjected to signal processing at the signal processing circuit 6-6 is outputted through the selector 6-7. A motion is thus detected on the basis of previously taken image data so that it is possible to prevent a failed, synthesized image from being outputted when the object is moved at the time of taking two images at different exposure amounts.

Figure 3A:
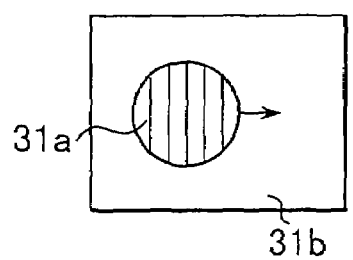
FIGS. 3A to 3D illustrate the manner of detecting motion at the motion detecting section in the first embodiment.
Figure 3B:
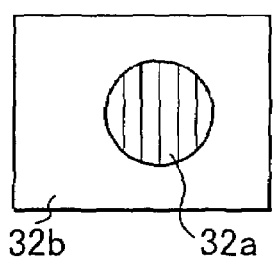
Figure 3C:
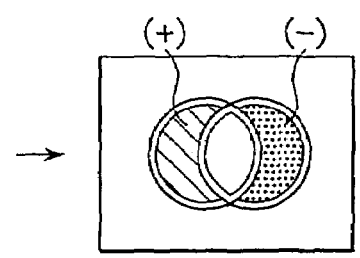

Actual motion detecting techniques to be performed at the motion detecting section 8A provided within CPU 8 will now be described by way of FIGS. 3A to 3D. There are two methods for detecting motion from previously taken two frames of image data. In a first method, a difference is obtained of a short-time exposure image data as shown in FIG. 3A (object 31a having a lack of detail at low level portion and background 31b taken at a suitable exposure in this short-time exposure image data) from a long-time exposure image data as shown in FIG. 3B (object 32a taken at a suitable exposure but background 32b lacking detail at its high level portion in this long-time exposure image data). If no motion occurs in the object, such difference becomes zero and an absence of motion is detected. On the other hand, if there is a motion, difference at the portion of occurrence of motion does not become zero as shown in FIG. 3C and a motion is thereby detected. It should be noted that, when obtaining difference between the two image data of different exposure amounts, the short-time exposure image data SE is multiplied by the exposure amount ratio A and its difference (LE−SE×A) from the long-time exposure image data LE is obtained. Referring to FIG. 3C, the slants represent the portion where the difference is "+" while the dotted region represents the portion where the difference is "−".

Figure 3D:
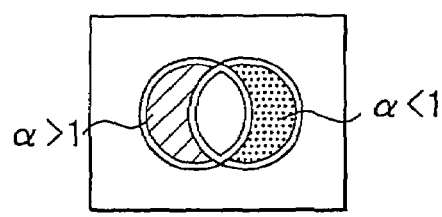

In another method for detecting motion, it is detected from ratio of the two image data of different exposure amounts. The exposure amount ratio of the two image data, A=LE/SE, is represented by α·A. When a motion as shown in FIG. 3D occurs, the slant portion represents a region where α>1 and the dotted portion represents a region where α<1, both indicating the moving portion. It is determined as an occurrence of motion of the object when these regions are detected.

A modification of the first embodiment will now be described. In this modification, when the amount of motion detected at the motion detecting section 8A is relatively small and is determined as within a range of allowable amount for correction by CPU 8, the motion is corrected and synthesizing process for wide dynamic range, synthesized image is performed. The motion correction circuit in this case is constructed as included in the synthesizing circuit 6-4.

Figure 4:
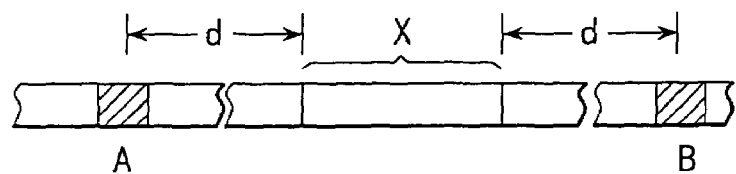
FIG. 4 explains the manner of correcting a motion by the motion correcting circuit.

In the method of correction by the motion correction circuit, if a region indicated by X is the region where motion is to be corrected when regions along a horizontal direction are taken into consideration as shown in FIG. 4, values are used of pixels A, B in regions without an occurrence of motion, at a suitable distance d for performing correction from the two ends of the region X to be corrected of motion. The A, B pixels are determined as at two ends and the motion is corrected by interpolating the motion correction region X so as to uniformly change pixel values between the two.

It should be noted that, since the region (object portion) without lacking detail in its highlighted portion in the long-time exposure image is used as it is for synthesis in generating a synthesized image, the "−" region where motion occurs as shown in FIG. 3C is not corrected and only the "+" region [i.e., region of LE−(SE×A)>0] is subjected to the motion correction. Further, as shown in FIG. 3D, since the region of α<1 is used as it is in the synthesizing process, a motion correction thereof is not performed and only the region of α>1 is corrected of motion.

Figure 5A:
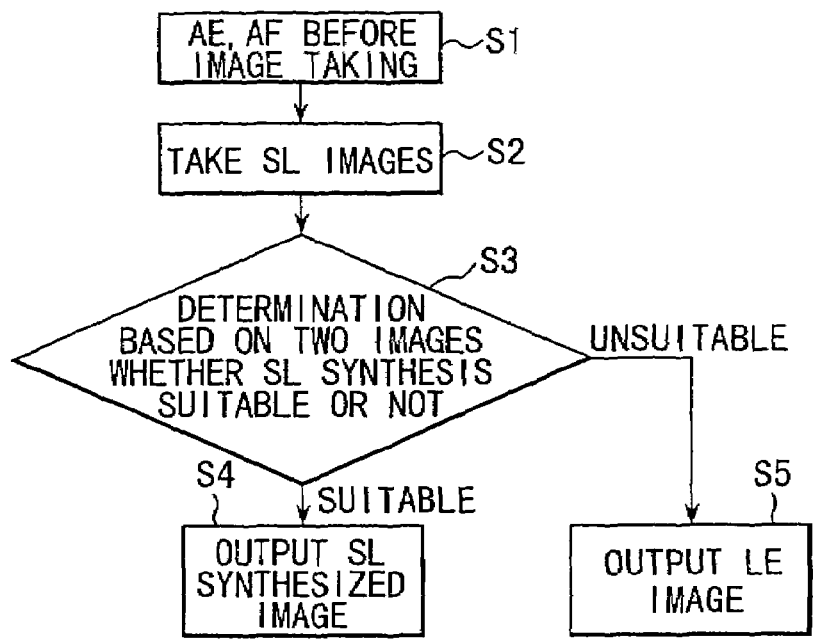
FIGS. 5A, 5B, 5C are flowcharts explaining camera control operation for performing ON/OFF switching of the generation processing of wide dynamic range, synthesized image based on previously taken image data.
Figure 5B:
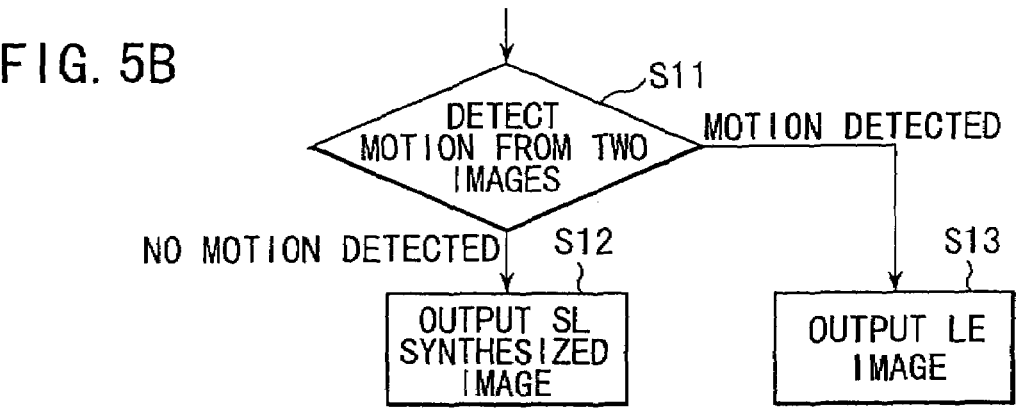
Figure 5C:
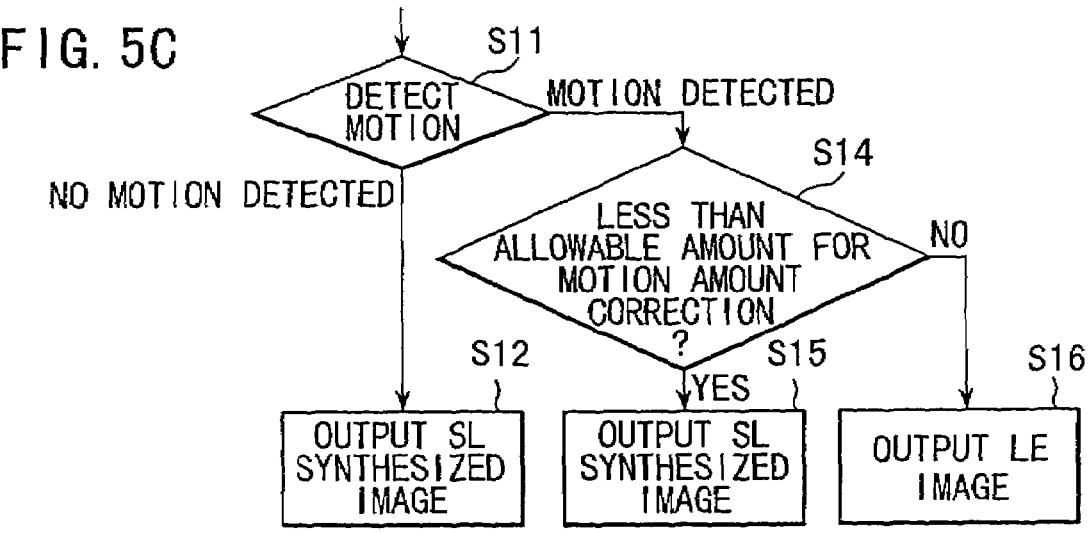

Shown in FIGS. 5A to 5C are flowcharts collectively representing a camera control operation in the above embodiment for effecting ON/OFF switching of the output of wide dynamic range, synthesized image on the basis of motion in previously taken image data, etc. FIG. 5A is the flowchart of a broader term of this embodiment showing camera control operation where ON/OFF switching of the synthesized image output is performed by determining based on previously taken image data whether or not the wide dynamic range, synthesized image is suitable. At first, in this case, AE, AF control is performed based on AE, AF information obtained before the main taking of image (step S1). An image is then taken twice under different exposure conditions (noted as SL image taking) to generate two image data (step S2). It is then determined whether wide dynamic range, synthesized image (noted as SL synthesized image) will be suitable or not on the basis of the two image data (step S3). If the wide dynamic range, synthesized image is suitable, the wide dynamic range, synthesized image is outputted (step S4). If the synthesized image is unsuitable, the image data of long-time exposure (noted as LE image) is outputted (step S5).

FIG. 5B is the flowchart showing a camera control operation in the case of detecting motion of the object from two image data under different exposure conditions to determine whether wide dynamic range, synthesized image will be suitable or not. In particular, after generating two image data of different exposure amounts at the same step, motion of the object is detected on the basis of the two image data (step S11). If motion of the object is not detected, a wide dynamic range, synthesized image is outputted (step S12). If motion of the object is detected, the wide dynamic range, synthesized image is determined as unsuitable and the long-time exposure image data is outputted (step S13).

FIG. 5C is a flowchart showing a camera control operation where, even when motion has been detected by detecting motion of the object from two image data under different exposure conditions, motion is corrected if the amount of motion is within an allowable range for correction. In particular, motion of the object is similarly detected on the basis of the two image data of different exposure amounts and, if motion is detected, it is determined whether the amount of the motion is within an allowable range for correction or not (step S14). If, then, the amount of motion is smaller than an allowable amount for correction, a wide dynamic range, synthesized image after corrected of motion is outputted (step S15). If the amount of motion is greater than the allowable amount for correction, the image data of the long-time exposure is outputted (step S16).

Figure 6:
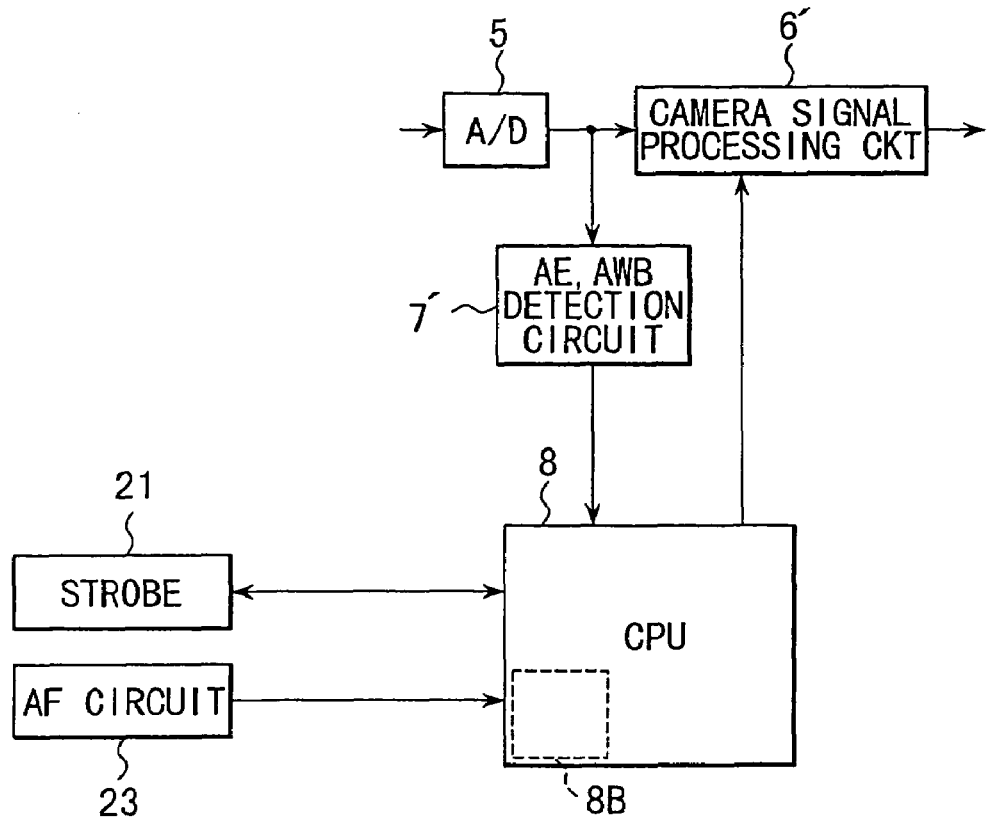
FIG. 6 is a block diagram showing main portions of a second embodiment of the present invention.
Figure 7:
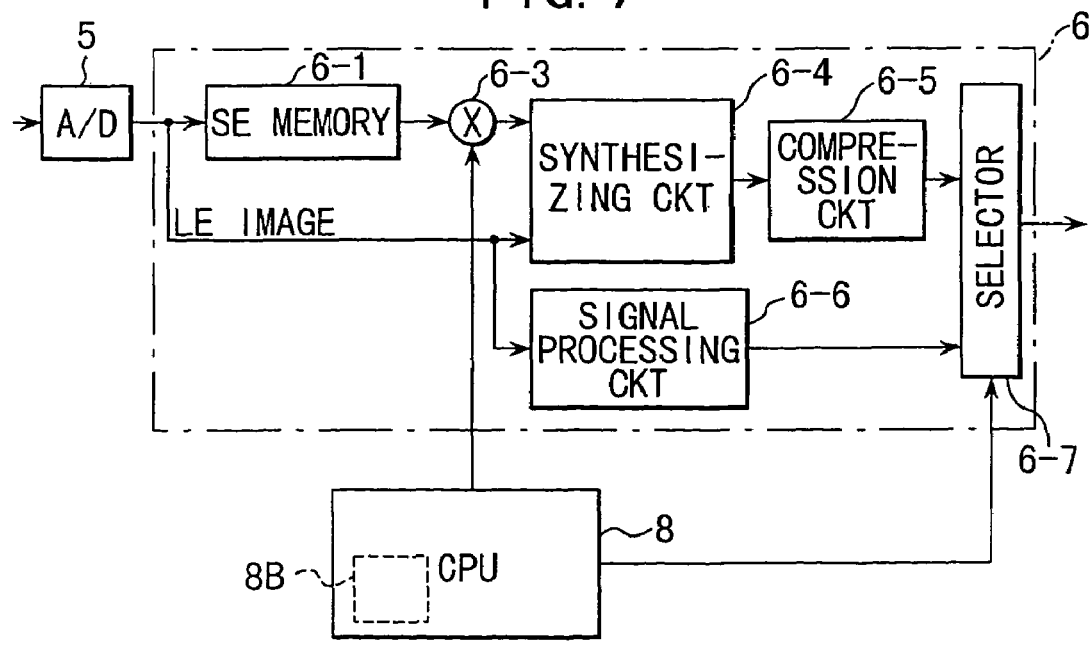
FIG. 7 is a block diagram showing an example of construction of camera signal processing circuit of the second embodiment shown in FIG. 6.

A second embodiment will now be described. In this embodiment, camera control including ON/OFF switching of the generation and outputting of wide dynamic range, synthesized image is performed on the basis of information obtained before the taking of image. FIG. 6 is a block diagram showing main portions of the second embodiment, where like components as in the first embodiment shown in FIG. 1 are denoted by like reference numerals. This is different from the first embodiment shown in FIG. 1 in that an external AF circuit 23 is provided and CPU 8 includes a motion detecting section 8B for detecting motion of the object on the basis of AF signals from the external AF circuit 23. Further, as shown in FIG. 7, the only frame memory included in the camera signal processing circuit 6' is SE memory 6-1 for storing short-time exposure image data. The short-time exposure image data is taken into SE memory 6-1. The short-time exposure image data is read out from SE memory 6-1 in accordance with timing of the long-time exposure image data and, after multiplication processing performed based on the exposure amount ratio, synthesizing process is performed at the synthesizing circuit 6-4 and compression processing is performed at the compression circuit 6-5. Furthermore, the AE, AF, AWB detection circuit 7 in the first embodiment is replaced by an AE, AWB detection circuit 7'.

Figure 8:
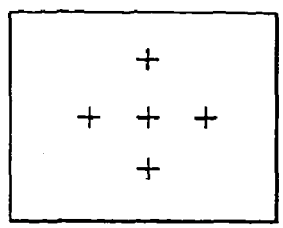
FIG. 8 shows the manner of AF processing at an external AF circuit.

Those which may be used as the external AF circuit 23 for example includes an AF sensor capable of finding range of a plurality of points (five points in the illustrated example) on the object as shown in FIG. 8. AF operation is performed twice and range-finding information is inputted to the motion detecting section 8B which is provided internally of CPU 8. It is determined at the motion detection circuit 8B as that the object is moving when a change occurs in distance information obtained by the two times of AF operation for any one of the plurality of range-finding points. The image is taken only at a long-time exposure based on the second distance information and, without performing the generation processing of synthesized image, only the image data of the long-time exposure is outputted.

In other words, in the second embodiment, motion of the object is detected at the motion detecting section 8B internally provided of CPU, based on AF signals from the external AF circuit. If no motion is detected, the selector 6-7 is previously switched at the camera signal processing circuit 6' so as to output a synthesized and compressed wide dynamic range image. If motion is detected, on the other hand, the selector 6-7 is previously switched so that a long-time exposure image data taken by the second AF information is outputted to prevent a synthesized image failed due to motion from being outputted.

Since ON/OFF switching of the outputting of synthesized image is thus previously performed based on AF information obtained before the taking of image from an external AF circuit, it is not necessary to drive CCD image pickup device in order to perform ON/OFF switching control of the synthesized image output, thereby reducing dissipation power. Further, it is not necessary to detect a motion on the basis of image data after the taking of image so that images can be taken in a manner suitable for the generation of wide dynamic range, synthesized image from the beginning.

Figure 9:
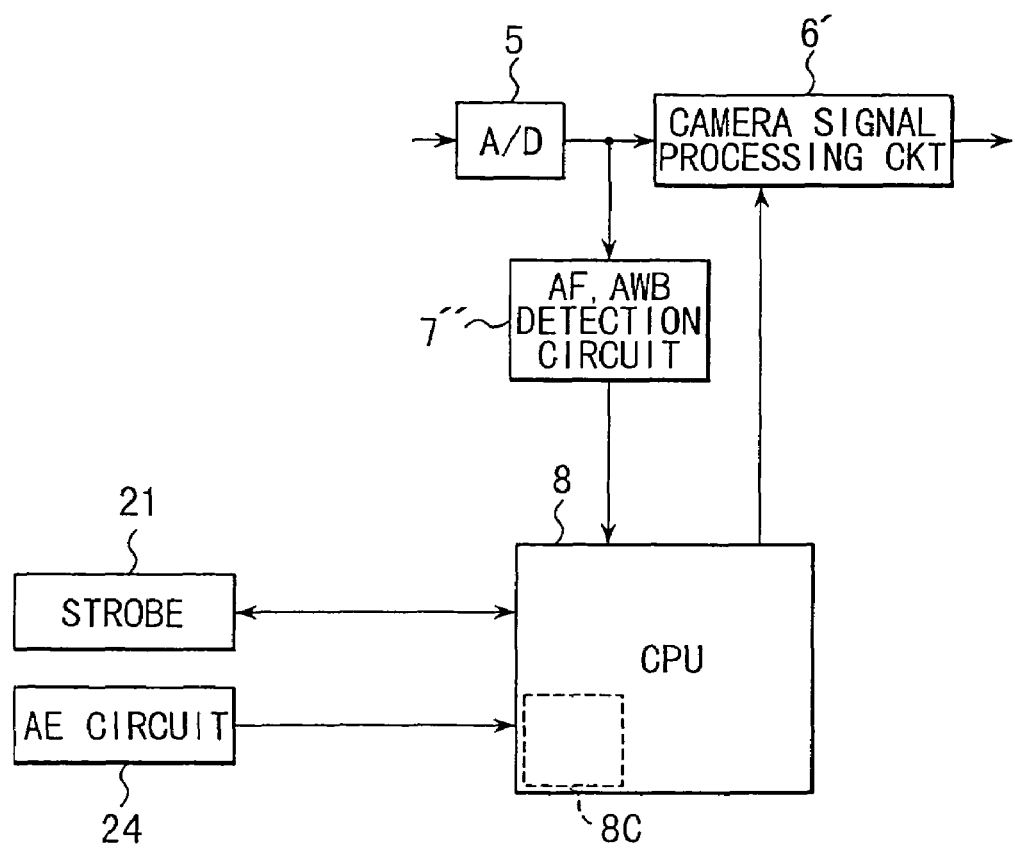
FIG. 9 is a block diagram showing main portions of a modification of the second embodiment shown in FIG. 6.

A modification of the present embodiment will now be described. In the above second embodiment, the external AF circuit is provided and motion of the object is detected on the basis of AF signals. In this modification, however, an external AE circuit 24 is provided as shown in FIG. 9 instead of the external AF circuit. A motion of the object is detected by a motion detecting section 8C provided in CPU 8 on the basis of two times of AE signals from the external AE circuit 24. In a similar manner as in the second embodiment based on such motion detection signals, if no motion is detected, the selector 6-7 of the camera signal processing circuit 6' shown in FIG. 7 is previously switched so as to output a wide dynamic range, synthesized image which has been synthesized and compressed. If a motion is detected, the selector 6-7 at the camera signal processing circuit 6' is also previously switched so that image-data of long-time exposure based on the second AE information is outputted. It should be noted that denoted by 7" in FIG. 9 is an AF, AWB detection circuit.

Figure 10:
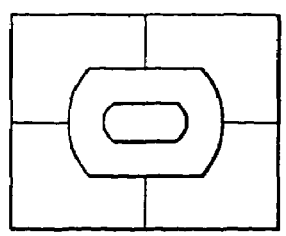
FIG. 10 shows the manner of AE processing at an external AE circuit.

Those which may be used as the external AE circuit 24 for example includes an AE sensor capable of photometry by dividing the object into a plurality of portions as shown in FIG. 10. AE operation is performed twice and exposure information is inputted to the motion detecting section 8C internally located at CPU 8. It is determined at the motion detecting section 8C as that the object is moving and image is taken of long-time exposure by the second exposure information when a change in exposure information occurs in any one of the plurality of divisional photometric regions between the two times of AE operation.

As the above, in this modification, too, motion of the object is detected at the motion detecting section 8C internally provided of CPU on the basis of AE information from the external AE circuit. When no motion is detected, the selector 6-7 of the camera signal processing circuit 6' is previously switched so that a wide dynamic range, synthesized image after synthesis and compression is outputted. If a motion is detected, on the other hand, the selector 6-7 is previously switched so that image data of long-time exposure taken by the second AE information is outputted to prevent a synthesized image failed due to motion from being outputted. Accordingly, since ON/OFF switching of the synthesized image output can be performed without driving the image pickup device, it is possible to reduce dissipation power and it is not necessary to detect motion on the basis of image data after the taking of image so that images can be taken in a manner suitable for the generation processing of synthesized image from the beginning.

Figure 11:
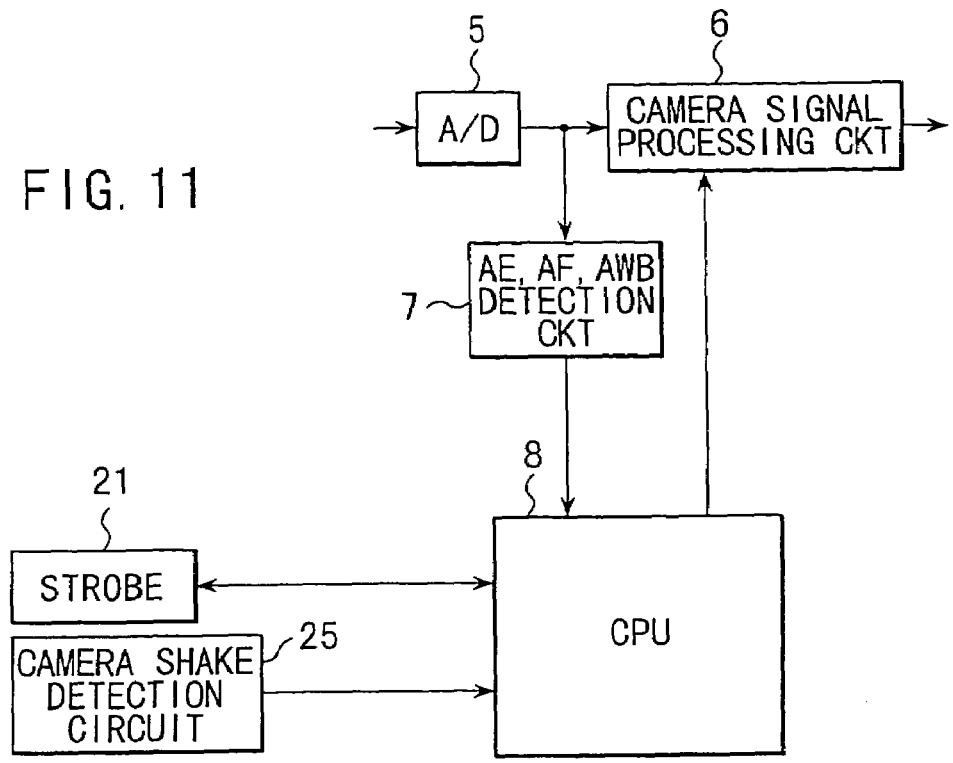
FIG. 11 is a block diagram showing main portions of another modification of the second embodiment.

A further modification will now be described. In this modification, as shown in FIG. 11, a camera shake detecting circuit 25 for example using an acceleration sensor is provided so that, when camera shake is detected, an image taking for the generation of synthesized image is not performed and image is taken anew. In other words, an occurrence of camera shake causes a difference between the two image data of different exposure amounts; if these are synthesized, an unsuitable synthesized image results. Accordingly, image is taken anew in case of camera shake so that it is possible to prevent a failed synthesized image from being outputted.

Figure 12:
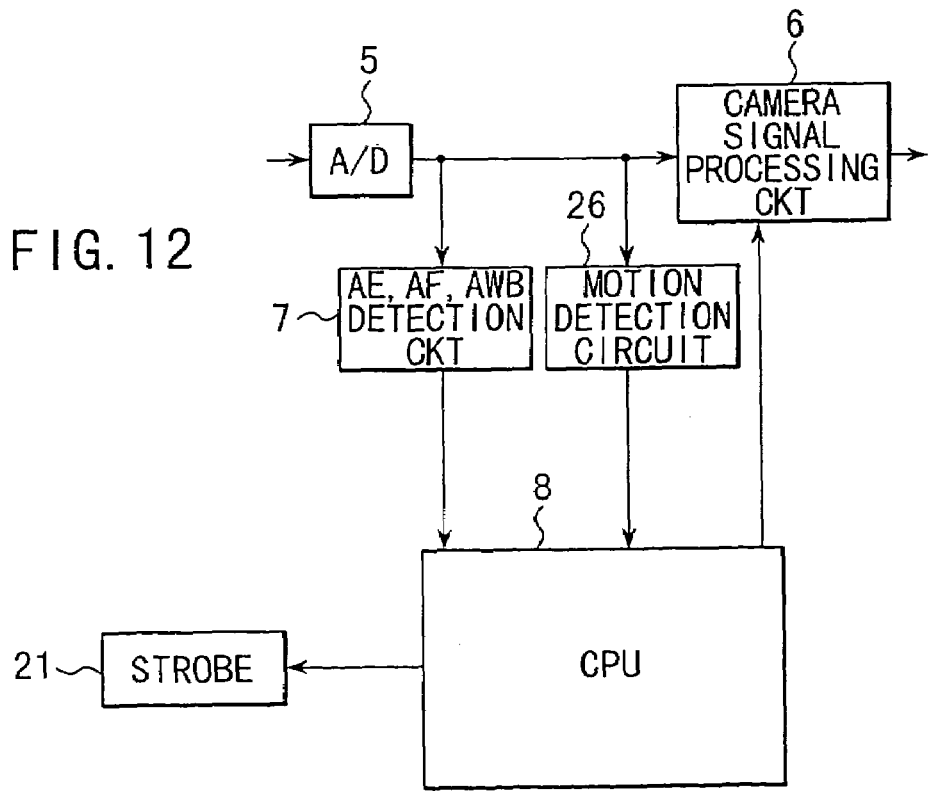
FIG. 12 is a block diagram showing main portions of a third embodiment of the present invention.

A third embodiment will now be described. FIG. 12 is a block diagram showing main portions of the third embodiment. In this embodiment, a motion detection circuit 26 is provided so that motion of the object is previously detected on the basis of image pickup data which is obtained from CCD image pickup device 1 before the main taking of image. When a motion has been detected, a wide dynamic range, synthesized image is generated by taking image twice at different exposure amounts (emission amount) by using a forced strobe emission.

The motion detection circuit 26 includes a memory for image data corresponding to two frames so that two image data of the same object previously obtained from CCD image pickup device 1 are alternately stored to the memory to detect motion of the object by using such known techniques as frame correlation. If a motion has been detected at the motion detection circuit 26, image is taken twice in a short time period with causing the strobe 21 through CPU 8 to emit twice by changing emission amount in such a manner as to correspond to an exposure amount ratio for obtaining a wide dynamic range image. A wide dynamic range, synthesized image is then generated by performing synthesizing process. Further, if motion is not detected, image is taken twice at different exposure amounts without using a forced emission of the strobe 21 to perform the generation processing of wide dynamic range, synthesized image. Accordingly, in this embodiment, the camera signal processing circuit does not require a selector as that shown in FIG. 2.

The generation processing of wide dynamic range, synthesized images is performed by thus using a forced strobe mode correspondingly to the motion of the object. Since, thereby, images can be taken with stopping the motion of the object for the two times of strobe image taking in a short time period, it is possible to prevent a failed synthesized image from being outputted.

This embodiment has been shown as that in which motion of the object is detected by using image pickup data from the CCD image pickup device. As shown in FIG. 6 or 9, however, it is also possible to detect motion at a motion detecting section provided internally of CPU from AF, AE information obtained before the taking of image by using an external AF circuit or external AE circuit, thereby causing the generation processing of synthesized image to be performed in a forced strobe mode.

A modification of the third embodiment will now be described. In this modification, when a motion of the object has been detected at the motion detecting circuit 26, a higher shutter speed is used instead of using a strobe emission. Exposure time is thereby reduced for both the short-time exposure image taking and the long-time exposure image taking so that the generation processing of wide dynamic range, synthesized image is performed by taking two images at different exposure amounts in a short time period.

Figure 13:
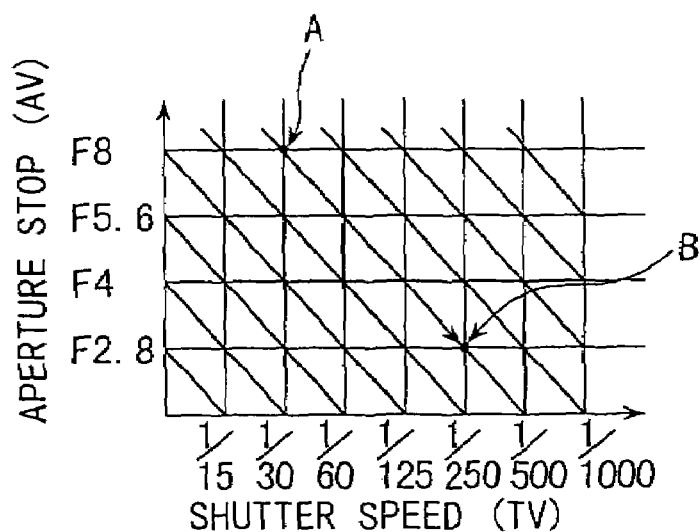
FIG. 13 shows a program diagram of shutter speed/ aperture stop.

In the case where images are taken by using a higher shutter speed as the above, a program shift for widening the aperture stop corresponding to the shutter speed is performed in order to achieve the same exposure amount even with the reduced exposure time due to the higher shutter speed. Specifically, in the program diagram of shutter speed/aperture stop as shown in FIG. 13, if a motion has been detected at point "A" where shutter speed is 1/30 and aperture value is F8, a program shift is made for example by shifting to point "B" where shutter speed is 1/250 and aperture is widened to F2.8. In this manner, the generation processing of wide dynamic range, synthesized image is performed by taking image twice at different exposure amounts by using a higher shutter speed. It is thereby possible to make smaller the motion of the object so that a synthesized image with lessened failure can be outputted.

A fourth embodiment will now be described. In this embodiment, when the object has been detected as in a backlighted condition by means of AE information previously obtained on the basis of image data from CCD image pickup device before the taking of image or AE information obtained from an external AE circuit, the generation processing of wide dynamic range, synthesized image is performed by taking image twice at different exposure amounts, since image data in a backlighted condition tends to have a wider dynamic range. In this case, too, since ON/OFF switching of the generation processing of wide dynamic range, synthesized image is performed on the basis of AE information previously obtained before the taking of image, the images can be taken in a manner suitable for the generation of wide dynamic range, synthesized image from the beginning.

A fifth embodiment will now be described. In this embodiment, camera control including ON/OFF switching of the generation processing of wide dynamic range, synthesized image is performed on the basis of such camera setting information as the image taking conditions set to the image pickup apparatus (camera) before the taking of image. Although the fundamental construction of this embodiment is similar to that of the first embodiment shown in FIG. 1, its camera signal processing circuit is of similar construction as that used in the second embodiment shown in FIG. 7. Here, camera control including ON/OFF switching of the generation processing of wide dynamic range, synthesized image is performed on the basis of various camera setting information to be set from the input key 22 of CPU 8. By thus causing camera control including the ON/OFF switching of wide dynamic range, synthesized image to be performed on the basis of information set to the camera before the taking of image, it becomes unnecessary to detect motion, etc., based on image pickup data after the taking of image and images can be taken in a manner suitable for the generation of wide dynamic range, synthesized image from the beginning, since ON/OFF switching of the generation processing of synthesized image is previously performed.

In a first manner of this embodiment, images are taken for the generation of wide dynamic range, synthesized image and the generation processing of synthesized image is performed when taking image in a strobe mode where strobe emission is used in combination, thereby linking ON/OFF switching of the synthesizing process to the setting of a strobe mode. In particular, even in the case of an object with motion or the like, it is possible when taking image in a strobe mode that the motion of the object be stopped and a wide dynamic range, synthesized image without a failure be obtained by causing strobe emission so as to take image twice at different exposure amounts in a short time period.

In a second manner of this embodiment, ON/OFF switching of the generation processing of wide dynamic range, synthesized image is linked to the shutter speed to be set. In particular, since a slower shutter speed results in a greater motion of the object, the generation processing of wide dynamic range, synthesized image is turned OFF. The shutter speed serving as a basis for ON/OFF switching of synthesizing process somewhat varies in a camera having zoom depending on zoom ratio. In particular, since a higher zoom ratio magnifies the motion, the set shutter speed for turning OFF the synthesized image generation processing is shifted toward a higher shutter speed.

In a third manner of this embodiment, ON/OFF switching of the generation processing of wide dynamic range, synthesized image is linked to the setting of an exposure. If, for example, the user effects spot photometry in setting exposure, it is most likely the case where an attempt is made to take image with performing spot photometry because of a backlighted condition. Therefore, if a spot photometry mode is set, images are taken for the generation of a wide dynamic range, synthesized image.

Further, when an exposure correction is effected manually in a camera having a manual exposure correcting function, since a manual exposure correction is most likely attempted in the case where the scene to be photographed is in a backlighted condition or the dynamic range of the object is large, images are taken for the generation of wide dynamic range, synthesized image at the time of manually corrected exposure.

In a fourth manner of this embodiment, ON/OFF switching of the generation processing of wide dynamic range, synthesized image is linked to the image taking mode. With a camera having a consecutive photographing function, for example, since the taking of image for the generation of wide dynamic range, synthesized image cannot be effected in a consecutive taking mode, the generation processing of synthesized image is switched to OFF when the consecutive taking mode has been set. Further, since too much motion is not likely to be involved in a scenery (distant view) photographing mode, the generation processing of synthesized image is turned ON when such mode has been set. Furthermore, since a large motion of the object is likely in a sports photographing mode, the generation processing of synthesized image is turned OFF when such mode has been set. Moreover, when a macro strobe photographing mode has been set, the generation processing of synthesized image is turned ON similarly to the strobe mode.

Since, in this manner, the generation processing of synthesized image is thus performed only when an image taking mode suitable for the generation of wide dynamic range, synthesized image has been set, it is possible to obtain a wide dynamic range, synthesized image without failure.

A sixth embodiment will now be described. In general, image is taken twice by previously setting exposure amount ratio thereof in a camera having a function for generating wide dynamic range, synthesized image. The exposure amount ratio of the two images actually taken, however, is not necessarily the same as the set value. If they are synthesized in such case, there is a disadvantage that a discontinuity in gradation tends to occur at the seam between the two images. This embodiment intends to mitigate this problem.

Specifically, in this embodiment, a camera having a function for generating wide dynamic range, synthesized image includes exposure amount correction means and ON/OFF switching of the exposure amount correction corresponding to shift in the exposure amount ratio is controlled on the basis of setting of an image taking mode which may cause a shift in the exposure amount ratio. By this construction, since exposure amount correction is performed only when an image taking mode requiring exposure amount correction has been set, it is not necessary to always detect exposure amount to determine whether an exposure amount correction is required or not.

In particular, an exposure amount correction is performed when a strobe image taking mode has been set. In other words, the exposure amount in taking image by using strobe depends not on the shutter speed but on the emission amount of the strobe. Since the strobe emission amount cannot so accurately be controlled, a considerable variance may occur in the exposure amount. Accordingly, correction of exposure amount is performed when a strobe emission mode has been set.

Figure 14:
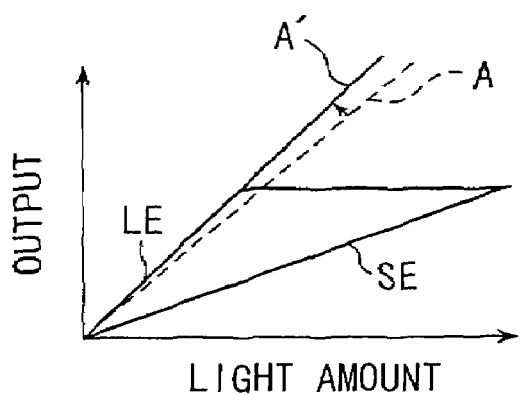
FIG. 14 explains the manner of correcting exposure amount.

The correcting operation of the exposure amount is performed as follows. Image data with a smaller exposure amount and image data with a greater exposure amount obtained by two times of image taking using strobe emission are stored to the two memories, i.e., SE memory and LE memory of the camera signal processing circuit shown in FIG. 2. These are supplied to CPU and regions are extracted of those without lack of detail at low level portion in the SE image data and those without lack of detail at high level portion in the LE image data. Sums $\Sigma SE$, $\Sigma LE$ of pixel data of the respective extracted regions are obtained. and an actual exposure amount ratio A' is obtained by the ratio $\Sigma LE/\Sigma SE$ of the two. As shown in FIG. 14, the synthesizing process is performed by multiplying the low exposure image data SE and the actual exposure amount ratio A'. A discontinuity in gradation at the seam between the two image data is thereby prevented. It should be noted that, in FIG. 14, the dotted line represents the case of taking images at a previously set exposure amount ratio A, indicating a discontinuity in gradation due to variance in the exposure amount ratio.

A seventh embodiment will now be described. The above embodiments have been shown as those in which synthesizing process for the generation of wide dynamic range, synthesized image is performed within the image pickup apparatus (camera) by using image data corresponding to two frames taken at different exposure amounts. The synthesizing process, however, is not necessarily required to be performed within the image pickup apparatus. It is also possible to provide a personal computer, printer, etc., with a synthesizing function so as to let it perform synthesis of the two frames.

In this embodiment, corresponding to the above manner, the fundamental construction of the image pickup apparatus (camera) is similar to the first embodiment shown in FIG. 1. The camera signal processing circuit 6, however, is different from that shown in FIG. 2 in that it does not require a memory, multiplier, synthesizing circuit, compression circuit, selector, etc., for the performance of synthesizing process and is constructed as a circuit for performing such ordinary signal processing as γ, edge enhancement, etc. Further, DRAM 11 requires a memory corresponding to two frames and the capacity of the memory card becomes a half the number of images, since data corresponding to two frames must be stored for each one image. It should be noted that it is also possible to provide detection means for detecting the remaining capacity of the memory card so that, when it is detected that the capacity for storing data corresponding to two frames is not left in the memory card, data corresponding to one frame can be stored by taking an image of one frame. It is thereby possible to take image corresponding to an ordinary one frame even when the remaining capacity is less than that for storing image data corresponding to two frames.

Figure 15:
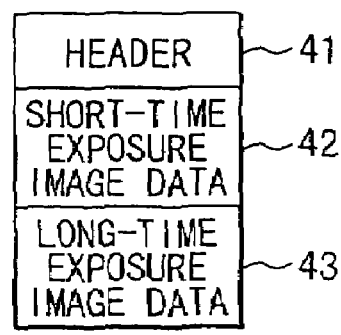
FIG. 15 shows the file structuring of image data and synthesizing information to be used in their synthesizing process.

In the embodiment constructed as the above, two frames of different exposure amounts are consecutively taken at CCD image pickup device by one release operation to generate image data corresponding to two frames. Such image data corresponding to two frames are treated as one file and are temporarily stored to DRAM 11. Further, the image data corresponding to two frames after signal processing and synthesizing information such as exposure amount ratio to be used at the time of synthesis are stored as one file to the memory card. The file structure includes a header 41, short-time exposure image data 42 and long-time exposure image data 43 as shown in FIG. 15. The header contains information for discriminating between short-time exposure image data and long-time exposure image data, exposure amount ratio, etc. In the synthesizing process, the file for synthesis is recognized and the header of the file is referred to by a dedicated software to automatically generate and display a wide dynamic range, synthesized image at personal computer 17 which is connected through the personal computer I/F 16 to the image pickup apparatus (camera).

Since two frames at different exposure amounts are thus consecutively taken by one release operation at the image pickup apparatus, an image of moving object such as a person can be taken without being aware of taking two frames. Further, a complicated processing is not performed within the image pickup apparatus due to the fact that the synthesizing process of image data of the taken two frames is performed at the personal computer externally connected to the image pickup apparatus. Since the processing time is shorter, it becomes possible to shorten the image taking interval. Furthermore, since the image data corresponding to two frames and the synthesizing information thereof are treated as one file and are subjected to synthesis by a dedicated software at the personal computer, a wide dynamic range image can be obtained in a similar manner as an ordinary taking of image without performing a special operation.

Figure 16:
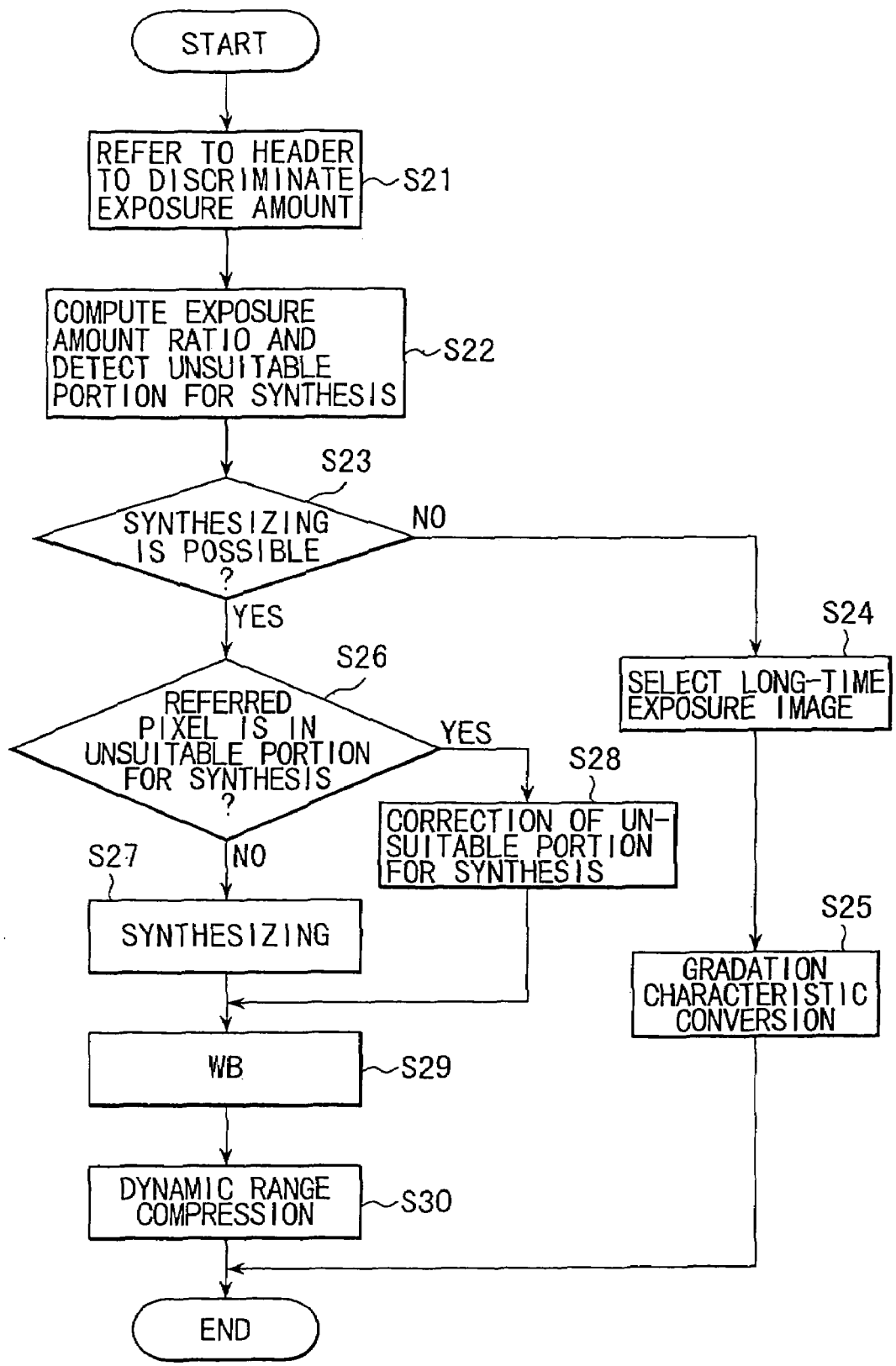
FIG. 16 is a flowchart explaining the processing operation in causing an externally connected personal computer to perform synthesizing process.

The synthesizing processing operation to be performed within the personal computer will now be described briefly by way of a flowchart shown in FIG. 16. First, the header of synthesizing process file is referred to and the exposure amounts of the respective image data corresponding to two frames at different exposure amounts are discriminated from each other (step S21). The exposure amount ratio of the two image data is computed on the basis of such exposure amounts and unsuitable portions for synthesis as those involving motion of the object are detected based on the two image data (step S22). From the result of detection of the above described unsuitable portions for synthesis, a determination is then made as to whether synthesizing process is possible or not (step S23). If a motion has been detected and at the same time if the amount of such motion goes beyond an allowable range for correction, it is determined as that synthesis is impossible and the long-time exposure image data is selected (step S24) and outputted after performing gradation characteristic transform, etc., (step S25).

On the other hand, if it is determined as that synthesizing is possible in processing at step S23 for determining whether synthesis is possible or not, it is then determined with respect to reference pixels whether the reference pixels are of portions unsuitable for synthesis or not (step S26). If not of portions unsuitable for synthesis, the synthesizing process is performed without alteration (step S27). On the other hand, if of portions unsuitable for synthesis, the portions unsuitable for synthesis are corrected using for example the method shown in FIG. 4 (step S28). Then, after white balance adjustment (step S29), the generated, synthesized image is subjected to processing for dynamic range compression and is outputted (step S30).

While the above embodiment has been shown as that for letting an externally connected personal computer perform synthesizing process, it is also possible that a synthesizing section be similarly provided at the printer 19 which is connected from the outside through the printer I/F 18 so that the header of the file is referred to at such synthesizing section to perform the image synthesizing process and to output a synthesized image. In such case, direct printing becomes possible.

As has been described by way of embodiments, in accordance with the first aspect of the present invention, since ON/OFF switching control of the generation processing operation at the means for generating wide dynamic range, synthesized image is performed based on image signals corresponding to a plurality of previously taken frames, an image pickup apparatus can be achieved as capable of accurately performing ON/OFF switching control of processing operation for the generation of wide dynamic range, synthesized image. In accordance with the second aspect of the invention, since motion detection means is provided so as not to perform the generation processing of synthesized image when a motion of the object is detected, it is possible when the object has been moved to prevent a failed, synthesized image from being outputted. In accordance with the third aspect of the invention, since the motion detection means and the motion amount determination means and motion correction means are provided so as to perform synthesizing process with correcting the amount of motion when the detected motion amount is within the allowable range for correction, it is possible to provide a grater range for the conditions of object of which a wide dynamic range, synthesized image can be formed.

Further, in accordance with the fourth aspect of the invention, since ON/OFF switching of the generation processing operation of wide dynamic range, synthesized image is performed on the basis of object information obtained before the taking of image, images can be taken in a manner suitable for the generation of wide dynamic range, synthesized image. In accordance with the fifth aspect of the invention, since images are taken in a forced strobe emission mode and the generation processing of synthesized image is performed when a motion in the object has been detected at the motion detection means, the motion in the object can in effect be stopped even of an object involving a motion, making it possible to readily generate a wide dynamic range, synthesized image. In accordance with the sixth aspect of the invention, since the generation processing of synthesized image is performed by using a higher shutter speed when a motion of the object has been detected, it is possible to lessen motion of the object in image signals corresponding to a plurality of frames. Further, since motion of the object can be in effect reduced in extent even for an object involving motion by using a higher shutter speed, it is possible to readily generate a wide dynamic range, synthesized image. In accordance with the seventh aspect of the invention, since a backlighted condition is detected at an AE detection circuit so as to perform the generation processing of wide dynamic range, synthesized image in a manner suitable at the time of backlighted condition, a synthesized image can be obtained as suitable for the backlighted condition.

Further, in accordance with an eighth aspect of the invention, since ON/OFF switching of the generation processing operation at the means for generating wide dynamic range, synthesized image is thus controlled based on information set in the image pickup apparatus before the taking of image, images can be readily taken in a manner suitable for the generation of wide dynamic range, synthesized image without requiring detection of the conditions for the generation of synthesized image from taken images. In accordance with the ninth aspect of the invention, ON/OFF switching of the generation processing operation of synthesized image can be performed in a manner linked to the shutter speed and zoom information so that the generation processing of synthesized image can be turned OFF to prevent a failed, synthesized image from being outputted when the shutter speed is slow or when the zoom ratio is high. In accordance with the tenth aspect of the invention, since means for correcting exposure amounts of image signals and ON/OFF switching control means based on the image taking mode of the exposure amount correction means are provided, exposure amount is not always detected and the exposure amounts can be corrected to obtain a suitable synthesized image only when there is a possibility of shift from the set exposure amounts of the image signals corresponding to a plurality of frames of different exposure amounts. In accordance with the eleventh aspect of the invention, since the exposure amount correction means is caused to operate at the time of a strobe image taking mode, a suitable synthesized image for example without discontinuity in gradation can be generated even if variance occurs in the amount of strobe emission at the time of strobe image taking mode.

Further, in accordance with the twelfth aspect of the invention, synthesizing process of the synthesized image is performed at an external synthesizing apparatus, it becomes unnecessary to perform a complicated synthesizing process within the image pickup apparatus so that time for processing of image taking is shortened and it becomes possible to reduce the image taking interval. In accordance with the thirteenth aspect of the invention, since means for detecting the remaining capacity of recording medium is provided and image signals corresponding to one frame is recorded when the remaining capacity is less than that for recording image signals corresponding to a plurality of frames, an ordinary image taking corresponding to one frame can be performed even when it is impossible to obtain a synthesized image. In accordance with the fourteenth aspect of the invention, since image signals corresponding to a plurality of frames and the synthesizing information thereof are recorded as a single file to the recording medium, it is possible to perform synthesizing process by treating them similarly as in the case of image signals corresponding to an ordinary single frame. In accordance with the fifteenth aspect of the invention, since image signals corresponding to a plurality of frames and synthesizing information thereof are recorded as a single file in a recording medium from which said file is read out to effect synthesizing process, a wide dynamic range synthesized image can be outputted similarly as in the case of an ordinary taken image without a special operation. In accordance with the sixteenth aspect of the invention, a recording medium can be provided as that recording a program by which synthesizing process can be readily performed of image signals corresponding to a plurality of frames obtained by taking images of the same object at a plurality of different exposure amounts.

What is claimed is:

1. An image pickup apparatus comprising: image pickup means capable of taking images of the same object at a plurality of different exposure amounts to generate image signals corresponding to a plurality of frames of different exposure amounts; and means for generating wide dynamic range, synthesized image by synthesizing the image signals corresponding to the plurality of frames of different exposure amounts obtained by the image pickup means, said image pickup apparatus further comprising:

means for determining whether or not a suitable synthesized image can be obtained on the basis of image signals corresponding to a plurality of previously taken frames; and means for controlling ON/OFF switching of the generation processing operation at said means for generating synthesized image on basis of an output of the determination means;

wherein said determination means includes means for detecting a moving portion in an object image and motion amount determination means for determining whether or not the amount of motion of said moving portion detected by the motion detection means is smaller than a maximum allowable amount for correction; and said means for generating synthesized image includes motion correction means for, when the amount of motion is determined as smaller than the maximum allowable amount for correction by the motion amount determination means, correcting only the amount of motion of said moving portion on the basis of such determination output, synthesizing process being performed with correcting the amount of motion of said moving portion of said image signals corresponding to the plurality of frames.

2. The image pick up apparatus according to claim 1, wherein said determination means switches OFF the generation processing operation at said means for generating synthesized image when the amount of motion of said moving portion is determined as not smaller than a maximum allowable amount for correction at said motion amount determination means.

3. The image pickup apparatus according to claim 2, wherein when said determination means switches off the generation processing operation at said means for generating synthesized image, image data of the long-time exposure is outputted.

* * * * *